3,009,954
PROCESS FOR THE PRODUCTION OF SARCOSINE AND RELATED ALKYLAMINO-ACETIC ACIDS
Preston H. Leake and Elvin K. Brakebill, Hopewell, Va., assignors to Allied Chemical Corporation, a corporation of New York
No Drawing. Filed Feb. 17, 1958, Ser. No. 715,529
7 Claims. (Cl. 260—534)

This invention relates to the production of sarcosine (N-methylamino-acetic acid: $CH_3NHCH_2COOH$) and other related lower alkylamino-acetic acids. It relates more particularly to improvements in the process of producing sarcosine and other related lower alkylamino-acetic acids by hydrolysis of lower alkylamino-acetonitriles.

An object of the present invention is to provide improvements in the acid-hydrolysis of lower alkylamino-acetonitriles whereby increased yields of the alkylamino-acetic acids in a purified form can be obtained.

Another object of the present invention is to provide improvements in the acid-hydrolysis of sarcosinonitrile to sarcosine, whereby sarcosine can be obtained in increased yields.

A further object of the present invention is to provide improvements in the acid-hydrolysis of sarcosinonitrile to sarcosine, whereby sarcosine of high purity can be obtained.

Other objects of the invention will in part be obvious and in part will appear hereinafter.

The lower alkylamino-acetic acids, such as sarcosine, ethylamino-acetic acid, propylamino-cetic acids, and butylamino-acetic acids, are important commercial chemicals. Thus, they are intermediates for the manufacture of creatine and related amino-acid compounds, and may serve as anti-enzyme agents in the manufacture of dentifrices.

It is known to produce sarcosine and other related lower alkylamino-acetic acids by reacting methylamine or another lower alkylamine with chloracetic acid. This process is objectionable from a commercial standpoint because of the high cost of the raw materials and the difficulty of removing the sodium chloride from the alkylamino-acetic acid.

It is also known to produce sarcosine and other related lower alkylamino-acetic acids by hydrolysis of the corresponding lower alkylamino-acetonitriles, but the products are contaminated by organic impurities formed in the hydrolysis, and the yields are low. Thus, it has been proposed to heat sarcosinonitrile with aqueous caustic alkali or with aqueous mineral acids, such as hydrochloric acid. Besides having the disadvantage of resulting in low yields of impure alkylamino-acetic acids, the alkaline hydrolysis has the disadvantage of producing the alkylamino-acetic acids in the form of the alkali metal salts from which the amino-acids must be liberated, and the hydrochloric acid procedure is disadvantageous since hydrochloric acid is corrosive to ordinary commercial apparatus and the removal of chlorides from the alkylamino-acetic acid product is difficult and costly.

According to the present invention, a lower alkylamino-acetonitrile is subjected to acid hydrolysis by means of sulfuric acid under special conditions, and, after removal of sulfate from the resulting product, the lower alkyl-amino acetic acid is purified by extracting impurities therefrom by means of a novel solvent for the organic impurities.

We have discovered that the above disadvantages of the hydrolysis procedure can be overcome and additional benefits can be secured by carrying out the hydrolysis of a lower alkylamino-acetonitrile with an excess of sulfuric acid in a novel manner and, after freeing the alkylamino-acetic acid product from sulfate, purifying the resulting crude alkylamino-acetic acid product with the aid of benzyl alcohol.

Thus, according to one feature of the present invention, the hydrolysis of a lower alkylamino-acetonitrile, such as sarcosinonitrile, is carried out with an excess of sulfuric acid in two stages, the first of which involves reacting the nitrile with at least one mol of sulfuric acid at a temperature not exceeding 70° C., whereby a sulfate of the alkylamino-acetonitrile is mainly formed, and then heating the resulting reaction mixture, containing excess sulfuric acid, at a temperature within the range 100°–150° C. (As employed here, including the claims, the term "an excess of sulfuric acid" denotes an amount of sulfuric acid in excess of the equimolar quantity of $H_2SO_4$.)

We have discovered that the yield of alkylamino-acetic acids obtained by the acid hydrolysis of a lower alkylamino-acetonitrile can be increased considerably, that the formation of undesired by-products can be reduced, and that the reaction will proceed smoothly and without violence, by carrying out the hydrolysis in this manner.

According to another feature of the present invention, a lower alkylamino-acetic acid which has been produced by the above acid hydrolysis and which has been freed from sulfate in any suitable manner, a number of which are well known, is purified by extracting organic by-products and impurities present with the alkylamino-acetic acids, by means of benzyl alcohol.

We have discovered that benzyl alcohol is a selective solvent for the organic impurities which are usually associated with lower alkylamino-acetic acids, and especially sarcosine, formed by the hydrolysis of the corresponding alkylamino-acetonitriles, particularly at ordinary atmospheric temperatures, at which the lower alkylamino-acetic acids are relatively insoluble in benzyl alcohol.

The invention accordingly comprises the several steps and the relation of one or more of such steps with respect to others thereof, which will be exemplified in the process hereinafter disclosed. The scope of the invention will be indicated in the claims.

In the practice of the present invention, a lower alkyl-amino-acetronitrile, more particularly one having 1 to 4 carbon atoms in the alkyl radical, and especially sarcosinonitrile, is reacted with sulfuric acid in an aqueous medium while cooling the reaction mixture to prevent the temperature from rising above 70° C., and preferably to maintain a temperature of 40° to 50° C. Preferably the acid is added slowly to an aqueous solution of the alkyl-amino-acetonitrile, with stirring.

In order to secure a maximum yield of alkylamino-acetic acid, the total amount of sulfuric acid employed is at least equal to one and three-quarter mols, and preferably 2 to 3 mols, of $H_2SO_4$ per mol of acetonitrile compound, and the amount of water present in the reaction mixture is such as to provide, with the sulfuric acid employed, an aqueous sulfuric acid of 25% to 85% strength, preferably 75% to 85% strength (based on the weight of $H_2SO_4$ and water in the reaction mixture). Various forms and strengths of sulfuric acid, including oleum, sulfur trioxide and 100% sulfuric acid, may be used in carrying out the reaction; but, for convenience, sulfuric acids of readily available commercial strengths are employed, such as 93%–98% sulfuric acids.

Preferably all of the sulfuric acid is added while cooling to a temperature not exceeding 70° C., but if desired about one mol of the sulfuric acid may be added initially with cooling, and the remainder added subsequently, either prior to or during the heating operation described below.

The resulting reaction mixture is heated to a temperature within the range 100°–150° C., preferably 125° to 145° C., to complete the hydrolysis of the nitrile radical to a carboxyl radical. If necessary, the heating is carried out under reflux. The resulting solution contains the lower alkylamino-acetic acid in the form of a sulfate, together with organic impurities formed as by-products and otherwise present in the solution, as well as ammonium sulfate and residual sulfuric acid.

In order to liberate the alkylamino-acetic acid from the sulfate and to remove the sulfate ion from the solution, the resulting solution is treated with a suitable compound adapted to form an insoluble sulfate with the sulfate ions in the solution and to liberate the alkylamino-acetic acid and ammonia; as, for example, lime, calcium hydroxide, barium oxide, barium hydroxide, calcium carbonate, barium carbonate, etc. Preferably, the solution is treated with an excess of calcium hydroxide; the resulting calcium sulfate is removed by sludge filtration, with or without washing of the sulfate filter cake; residual sulfate ions in the solution are precipitated as barium sulfate by addition of a small amount of barium hydroxide to the solution; the resulting solution is then carbonated, by passing in a stream of carbon dioxide until residual calcium and barium hydroxides present in the solution are converted to carbonates; and the solution is again sludge filtered to remove the insoluble carbonates and sulfates.

The resulting solution of impure alkylamino-acetic acid is then preferably concentrated by evaporation of water, preferably at subatmospheric pressure, until the major part of the water is removed. Preferably at least 25%, and particularly 25% to 35%, by weight, of the resulting concentrated mass is water. If the mass is evaporated to dryness, difficulties are encountered in the drying and in the further treatment of the dried mass which is hard and gummy. The remaining water is then removed by azeotropic distillation with benzyl alcohol, preferably at subatmospheric pressure, and organic impurities present in the resulting solution of impure alkylamino-acetic acid are removed by dissolving them in benzyl alcohol and separating the benzyl alcohol solution from the purified alkylamino-acetic acid.

Preferably the azeotropic distillation is carried out with an amount of benzyl alcohol which is in excess not only of that required to remove all of the water present in the concentrated solution but also of that required to dissolve the impurities; so that the mixture resulting from the azeotropic distillation consists of the purified alkylamino-acetic acid and a solution of the impurities in benzyl alcohol. In general, at least 1 part by weight of benzyl alcohol per part by weight of alkylamino-acetic acid is employed and preferably 3 to 6 parts by weight of benzyl alcohol per part by weight of sarcosine are used.

The invention will be illustrated by the following specific examples, but it is to be understood that the invention is not limited to their details and that changes may be made without departing from its scope. The temperatures are in degrees centigrade and the parts and percentages are by weight.

Example 1

*Part 1.*—Sarcosinonitrile was produced by bubbling 31 parts (1 mol) of methylamine into 81.2 parts of 37% aqueous formaldehyde (1 mol) during 35 minutes while maintaining the temperature at 30–40° by cooling, then stirring 27 parts (1 mol) of liquid hydrogen cyanide into the resulting formaldehyde-methylamine solution, which was maintained at 40–45°, and stirring the reaction mixture for an additional 15 minutes at 40°, to obtain substantially complete conversion to sarcosinonitrile.

*Part 2.*—To the resulting sarcosinonitrile-containing reaction mixture, 204 parts of 96% sulfuric acid (2 mols) were added over the course of 30 minutes while cooling to maintain the temperature at 40–50°. The resulting solution was then refluxed at about 135° for a half hour, to produce sarcosine sulfate. The major portion of the sulfate ion was precipitated and removed by gradually adding a slurry of 244 parts of calcium hydroxide (3.3 mols) in 723 parts of water to the solution while maintaining the solution below 60°, stirring for an additional 10 minutes, filtering off the calcium sulfate, and washing the filter cake with 600 parts of water. The remaining sulfate ion was removed by treating the filtrate with 3.2 parts of barium hydroxide—$Ba(OH)_2 \cdot 8H_2O$—and filtering. Carbon dioxide was then passed into the filtrate until precipitation of barium and calcium carbonates was complete. The pH of the mix was then about 8.8. Filtration of this mass produced approximately 1500 parts of crude aqueous solution of sarcosine, containing 84 parts of sarcosine together with water-soluble organic impurities.

*Part 3.*—The crude sarcosine solution was evaporated at about 100 mm. Hg pressure until the solution weight was 195 parts, of which about 84 parts were solids. Then 300 parts of benzyl alcohol were added, and the mixture was distilled at about 90 mm. Hg pressure until the remaining water was removed as distillate. The maximum pot temperature was 83°. The residue was cooled to about 30°, and the sarcosine was separated by filtration, rinsed with small portions of benzyl alcohol, followed by benzene, and dried at about 100°. The yield of sarcosine was 61.6 parts (69.3% of theory). The product was demonstrated to be highly pure by infra-red analysis.

Benzyl alcohol was recovered for reuse by mixing the filtrate with 200 parts of water, extracting the mixture with 528 parts of benzene, separating the benzene layer from the aqueous layer, and distilling off the benzene.

Example 2

Sarcosinonitrile was prepared as described in Example 1, part 1. To the resulting reaction mixture, 102 parts of 96% sulfuric acid (1 mol) were added over the course of 15 minutes while cooling to 50–60°. Then 102 parts of 96% sulfuric acid (1 mol) were added, and the resulting solution was refluxed at about 135° for a half hour, to produce sarcosine sulfate. The resulting solution was then subjected to further treatment as described in Example 1, parts 2 and 3.

It will be evident to those skilled in the art that the invention is not limited to the details of the foregoing illustrative examples and that changes can be made without departing from the scope of the invention.

Thus, instead of sarcosinonitrile, other lower alkylamino-acetonitriles may be subjected to the above process; as, for example, N-ethylamino-acetonitrile
N-propylamino-acetonitrile
N-butylamino-acetonitrile The sarcosinonitrile subjected to the hydrolysis can be prepared in other ways besides that employed in the examples, a number of which are well known. It is preferred, however, to react methylamine with formaldehyde and hydrogen cyanide, since their interaction leads to the formation of sarcosinonitrile and water as the primary products without introducing substantial amounts of extraneous substances into the reaction product.

It is preferred to prepare the alkylamino-acetic acid by hydrolysis with sulfuric acid in the manner described above and to purify the resulting crude alkylamino-acetic acid by means of benzyl alcohol, especially in conjunction with removal of water from the aqueous solution of alkylamino-acetic acid by azeotropic distillation with benzyl alcohol, since high yields of pure alkylamino-acetic acid are thereby obtained. If it is desired, however, to secure only a part of the total benefits of the combined process, the sulfuric acid hydrolysis procedure can be employed without the use of benzyl alcohol as a purifying agent, and benzyl alcohol can be employed as a purifying agent for lower alkylamino-acetic acids produced by hydrolysis of the corresponding nitriles with other acids, such as hydrochloric acid, or with alkalis, such as alkali metal and alkali earth metal hydroxides.

We claim:

1. In the process of producing a lower alkylamino-acetic acid by reacting a lower alkylamino-acetonitrile with an excess of sulfuric acid, whereby a mixture of a sulfate of a lower alkylamino-acetic acid, ammonium sulfate and impurities is formed, treating the resulting mixture to liberate the lower alkylamino-acetic acid and form an insoluble sulfate, and separating the insoluble sulfate from the remaining aqueous solution, the improvement of concentrating the remaining solution by evaporating off a portion of the water contained therein, removing addition water from the concentrated solution by azeotropic distillation with an amount of benzyl alcohol in excess of that required for removal of all of the water, cooling the resulting mixture, and separating solid alkylamino-acetic acid from the remaining benzyl alcohol solution of impurities.

2. A method of recovering a lower alkylamino-acetic acid in a purified form from an aqueous solution of the acid containing organic impurities formed in the hydrolysis of the corresponding nitrile in the presence of sulfuric acid; which comprises removing water from the solution by azeotropic distillation with an amount of benzyl alcohol in excess of that required for removal of all of the water, and separating the lower alkylamino-acetic acid in a purified form from the remaining benzyl alcohol solution of impurities.

3. A method of recovering a lower alkylamino-acetic acid in a purified form from an aqueous solution of the acid containing organic impurities formed in the hydrolysis of the corresponding nitrile in the presence of sulfuric acid, which comprises concentrating the aqueous solution to a water content of 25% to 35% by weight by distillation of water, adding an amount by weight of benzyl alcohol at least equal to the weight of alkylamino-acetic acid present in said solution, removing water from the resulting concentrated solution by azeotropic distillation with the benzyl alcohol, cooling the resulting mixture, and separating solid alkylamino-acetic acid from the remaining benzyl alcohol solution of impurities.

4. A method of recovering sarcosine in a purified form from an aqueous solution of sarcosine containing water-soluble organic impurities formed in the hydrolysis of sarcosinonitrile in the presence of sulfuric acid, which comprises concentrating the aqueous solution to a water content of 25% to 35% by weight by distillation of water at a temperature not exceeding 100° C., adding 3 to 6 parts by weight of benzyl alcohol per part by weight of sarcosine present in said solution, removing water from the resulting concentrated solution by azeotropic distillation with the benzyl alcohol, cooling the resulting mixture, and separating solid sarcosine in a purified form from the remaining benzyl alcohol solution of impurities by filtration.

5. A method of producing sarcosine which comprises mixing sarcosinonitrile with aqueous sulfuric acid of 25% to 85% strength in an amount corresponding to at least one and three-quarter mols of $H_2SO_4$ per mol of sarcosinonitrile, while maintaining the mixture at a temperature not exceeding 70° C.; heating the resulting mixture at a temperature within the range 100°–150° C., whereby an aqueous mixture of a sulfate of sarcosine, ammonium sulfate and organic impurities is formed; reacting the resulting aqueous mixture with a calcium compound adapted to convert the sulfate of sarcosine to sarcosine in aqueous solution and calcium sulfate, separating calcium sulfate from the remaining solution, removing water from the resulting solution by azeotropic distillation with an amount of benzyl alcohol in excess of that required for removal of all of the water, whereby a solution of impurities in benzyl alcohol is formed, and separating purified sarcosine from the resulting benzyl alcohol solution of impurities.

6. A method of recovering sarcosine in a purified form from an aqueous solution of sarcosine containing organic impurities formed in the hydrolysis of sarcosinonitrile in the presence of sulfuric acid, which comprises removing water from the solution by azeotropic distillation with an amount of benzyl alcohol in excess of that required for removal of all of the water, and separating sarcosine in a purified form from the remaining benzyl alcohol solution of impurities.

7. A method of recovering sarcosine in a purified form from an aqueous solution of sarcosine containing water-soluble organic impurities formed in the hydrolysis of sarcosinonitrile in the presence of sulfuric acid, which comprises removing water from the solution by azeotropic distillation with an amount by weight of benzyl alcohol at least equal to the weight of sarcosine present in said solution and separating sarcosine in a purified form from the remaining benzyl alcohol solution of impurities.

References Cited in the file of this patent

FOREIGN PATENTS

| | | |
|---|---|---|
| 654,770 | Germany | Dec. 30, 1937 |
| 655,563 | Germany | Jan. 18, 1938 |
| 656,539 | Germany | Feb. 19, 1938 |